United States Patent
Yeh et al.

(10) Patent No.: US 9,014,213 B2
(45) Date of Patent: Apr. 21, 2015

(54) METHOD FOR SUPPORTING TIME SYNCHRONIZATION RELAYING TO NEIGHBORING NODES IN WIRELESS NETWORK

(75) Inventors: Choongil Yeh, Daejeon (KR); Dong Hyun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 253 days.

(21) Appl. No.: 13/247,094

(22) Filed: Sep. 28, 2011

(65) Prior Publication Data

US 2012/0155370 A1 Jun. 21, 2012

(30) Foreign Application Priority Data

Dec. 21, 2010 (KR) .................... 10-2010-0131850

(51) Int. Cl.
*H04B 7/14* (2006.01)
*H04W 56/00* (2009.01)
*H04B 7/155* (2006.01)

(52) U.S. Cl.
CPC ...... *H04W 56/0015* (2013.01); *H04W 56/0025* (2013.01); *H04B 7/155* (2013.01)

(58) Field of Classification Search
None
See application file for complete search history.

(56) References Cited

U.S. PATENT DOCUMENTS

| | | | |
|---|---|---|---|
| 6,590,891 B1 * | 7/2003 | Jacquet et al. | 370/350 |
| 7,869,378 B2 | 1/2011 | Livet et al. | |
| 2002/0080813 A1 * | 6/2002 | Kim | 370/443 |
| 2003/0142626 A1 * | 7/2003 | Umayabashi et al. | 370/236.2 |
| 2005/0281247 A1 * | 12/2005 | Lim et al. | 370/350 |
| 2006/0025136 A1 * | 2/2006 | Fujita et al. | 455/436 |
| 2008/0045141 A1 * | 2/2008 | Suga | 455/7 |
| 2008/0247366 A1 * | 10/2008 | Celentano et al. | 370/338 |
| 2008/0253355 A1 * | 10/2008 | Tominaga et al. | 370/350 |
| 2009/0103437 A1 * | 4/2009 | Kim et al. | 370/235 |
| 2009/0213853 A1 * | 8/2009 | Kwon et al. | 370/389 |
| 2009/0303918 A1 * | 12/2009 | Ma et al. | 370/315 |
| 2009/0323669 A1 * | 12/2009 | Salonidis et al. | 370/350 |
| 2010/0208695 A1 * | 8/2010 | Youn et al. | 370/331 |
| 2010/0265936 A1 | 10/2010 | Yeh et al. | |
| 2010/0329278 A1 | 12/2010 | Park et al. | |
| 2011/0080889 A1 * | 4/2011 | Kanterakis | 370/329 |

FOREIGN PATENT DOCUMENTS

| | | |
|---|---|---|
| KR | 10-2007-0034940 | 3/2007 |
| KR | 10-2009-0007194 | 1/2009 |

OTHER PUBLICATIONS

L.G. Roberts, "ALOHA Packet System With and Without Slots and Capture", Computer Communications Review 5, p. 28-42, Apr. 1975.

* cited by examiner

*Primary Examiner* — Kwang B Yao
*Assistant Examiner* — Hardikkumar Patel
(74) *Attorney, Agent, or Firm* — Staas & Halsey LLP

(57) ABSTRACT

Under a wireless communication environment in which nodes sharing a time reference communicate information with a frame having a predetermined structure, when a node that has failed to acquire synchronization, a protocol in which neighboring nodes relays synchronization to the synchronization acquisition failed node by using a preamble defined in the frame is provided.

16 Claims, 3 Drawing Sheets

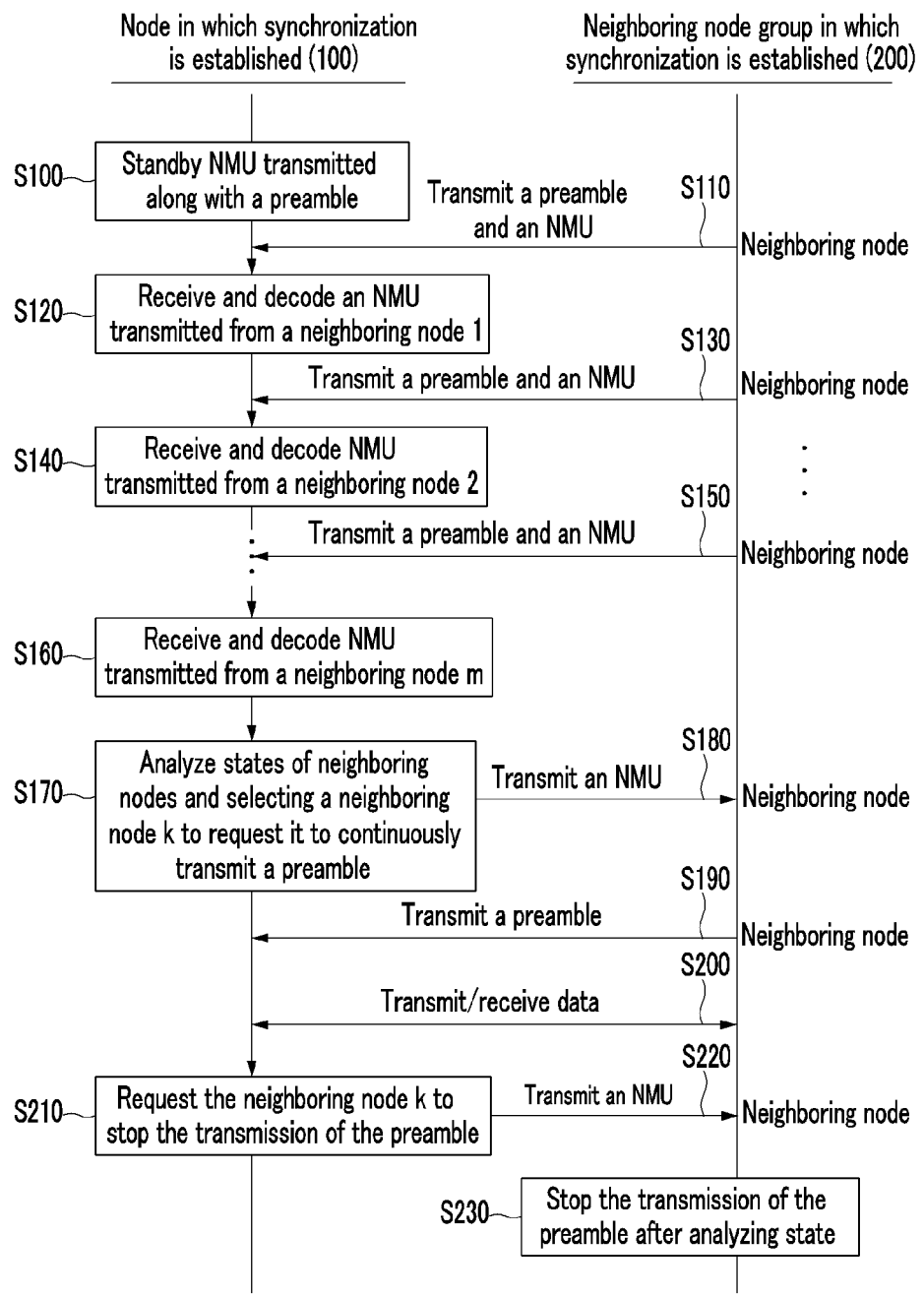

METHOD FOR SUPPORTING TIME SYNCHRONIZATION RELAYING TO NEIGHBORING NODES IN WIRELESS NETWORK

CROSS-REFERENCE TO RELATED APPLICATION

This application claims priority to and the benefit of Korean Patent Application No. 10-2010-0131850 filed in the Korean Intellectual Property Office on Dec. 21, 2010, the entire contents of which are incorporated herein by reference.

BACKGROUND OF THE INVENTION (a) Field of the Invention

The present invention relates to a communication protocol. More particularly, the present invention relates to a method for supporting time synchronization relaying to neighboring nodes in a wireless network.

(b) Description of the Related Art

Random multiple access is an algorithm in which each node occupies a radio resource without a center control based on a predetermined agreement to efficiently minimize collision between nodes and transmits/receives a packet in a wireless communication system in which a plurality of nodes share a radio resource. If there is a time reference to which all nodes refer in common, the efficiency in using the radio resource will be enhanced. When a plurality of nodes share a single channel of radio resource and compete to occupy the single channel such as in OFDM (orthogonal frequency division multiplexing), a common time reference relates to efficiency of using the radio resource. However, when a plurality of nodes share multiple channels of a radio resource with OFDMA (orthogonal frequency-division multiple access), the common time reference is for more than improving the efficiency. Synchronization between nodes can be required for operation as well as improvement of efficiency.

In case of a wireless network using a wireless local area network (WLAN) of IEEE 802.11, nodes occupy a channel with a random scheme based on an algorithm referred to as carrier sense multiple access with collision avoidance (CSMA/CA) and transmit a packet. The nodes insert a preamble in the head of the packet so that a receiving node recognizes a starting point of a received packet.

In addition, a base station has a common time reference obtained by a global positioning system (GPS), etc., in a typical mobile communication system and then can arrange starting points of communication frames. Generally, a preamble is inserted to a downlink frame transmitted by a base station and a terminal can recognize the starting point of the downlink frame, that is, a common time reference, using the preamble.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for providing time synchronization nodes in a wireless network in which a plurality of nodes having a common time reference and a plurality of nodes having no common time reference are included.

Also, the present invention has been made in an effort to provide a communication method for relaying synchronization to a node having no common time synchronization in the wireless network.

In addition, the present invention has been made in an effort to provide a communication method for allowing a node that has acquired synchronization to relay synchronization to a node that fails to acquire synchronization in a wireless network composed of the nodes.

An exemplary embodiment of the present invention provides a method for allowing a node that has acquired synchronization to relay synchronization to a node that fails to acquire synchronization in a wireless network that comprises a first node having acquired synchronization and a second node that has failed to acquire synchronization. The method comprises: receiving, by the second node, a preamble transmitted from at least one first node, wherein the preamble is disposed in a predetermined position of a frame; acquiring, by the second node, time synchronization using the received preamble; and selecting, by the second node having acquired the time synchronization, one first node among the at least one first node and being provided with a preamble from the selected first node to manage the time synchronization.

Another embodiment of the present invention provides a communication method for allowing a node that has acquired synchronization to relay synchronization to a node that fails to acquire synchronization in a wireless network that includes a first node having acquired synchronization and a second node having failed to acquire synchronization.

The method includes: acquiring synchronization, by the second node, by receiving a preamble disposed in a predetermined position of a frame transmitted from at least one first node and receiving a message transmitted through an NMU (network management unit) slot of the frame; selecting, by the second node, one first node among the at least one first node; transmitting, by the second node, an NMU message including a preamble transmission request field in which information for requesting the selected first node to continuously transmit a preamble that is written to the selected first node; and maintaining, by the second node, time synchronization by using a preamble transmitted from the selected first node.

In the communication method, the NMU message comprises at least one transmitter ID field for including an identifier of a node for transmitting a message, a neighboring node information field for including a set of identifiers for neighboring nodes, a node state field for representing a state of a node, a preamble transmission request field for representing requesting to transmit a preamble, and a preamble transmission stop request field for representing requesting to stop transmission of a preamble.

The node state field comprises at least one backbone connection state for representing whether a node is connected to a backbone network, a synchronization acquisition state for representing which method a node uses for synchronization acquisition, a continual preamble transmission state for representing whether a node for transmitting an NMU, according to a request of a neighboring node, transmits a preamble every frame, a preamble application state for representing whether or not a node continuously transmits a preamble according to a request of another node, and a power supplying state for representing which method is used to supply power to a node.

BRIEF DESCRIPTION OF THE DRAWINGS

FIG. 3 shows a flowchart of the communication method according to an exemplary embodiment of the present invention.

DETAILED DESCRIPTION OF THE EMBODIMENTS

Figure 1:
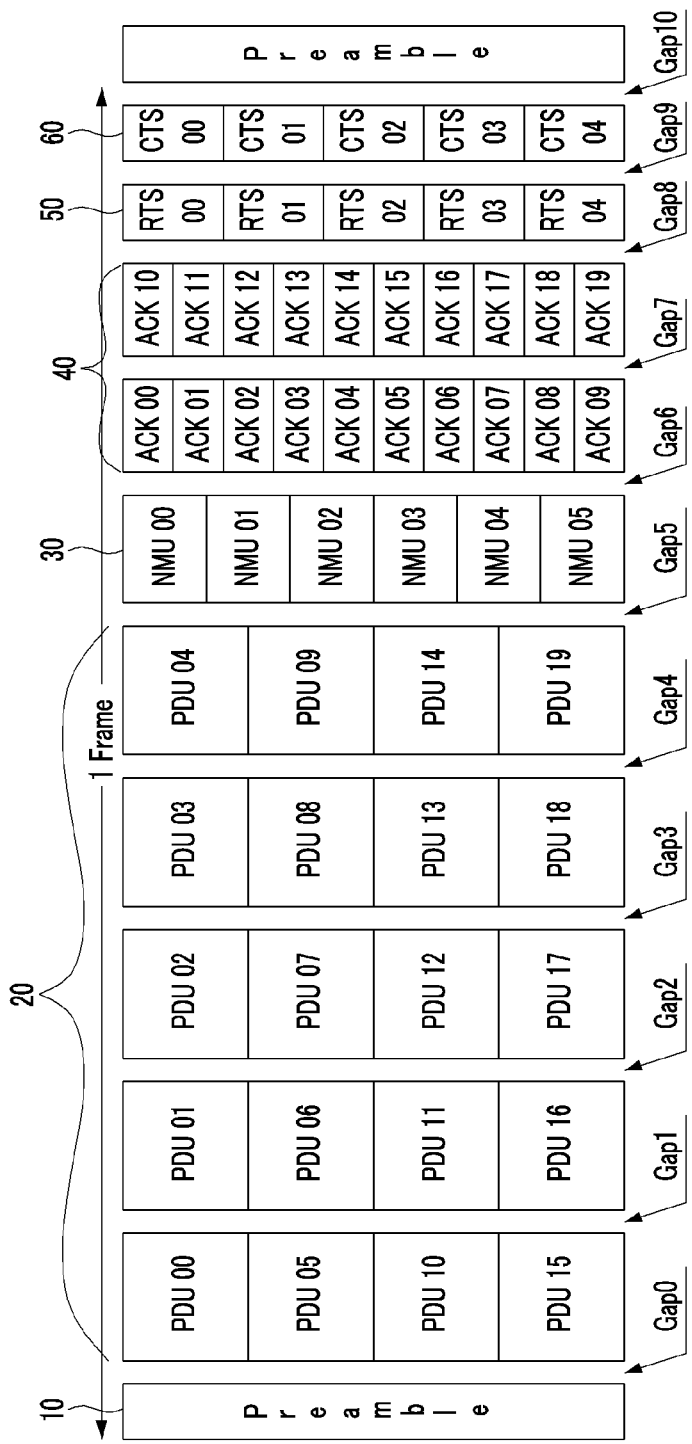
FIG. 1 shows a structure of a frame according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

A communication method for supporting relaying time synchronization to nodes in a wireless network according to an exemplary embodiment of the present invention will be described.

The wireless network according to an exemplary embodiment of the present invention is assumed to be a network in which a plurality of nodes having a common time reference and a plurality of nodes having no common time reference are included. Herein, the plurality of nodes with no common time reference may fail to acquire a common time reference because of shielding by an obstacle and other reasons.

In the wireless network, it is assumed that a common time reference is predetermined and that a packet is transmitted or received based on a predetermined frame structure. A node having no common time reference cannot transmit a packet based on the predetermined frame structure because it does not know a starting point of a frame. When a preamble is defined at a predetermined position of a frame when designing the frame structure, a node having a common time reference can transfer synchronization to a node having no common time reference. Similarly, a node that has acquired synchronization using a preamble can transfer the synchronization to a node having a common time reference by transmitting the preamble to it. The method for transferring synchronization is referred to as a synchronization relaying method using a preamble.

When using the synchronization relaying method using a preamble, there is no need for all nodes to transmit a preamble. In particular, nodes that do not have a common time reference but that have acquired synchronization by receiving a preamble do not have to transfer the preamble. A communication method based on the synchronization relaying method in an exemplary embodiment of the present invention will be provided. Particularly, methods for determining when a particular node transmits a preamble and how a node having no common time reference requires a neighboring node to transmit a preamble will be provided.

FIG. 1 shows a structure of a frame according to an exemplary embodiment of the present invention.

As shown in FIG. 1, the frame according to an exemplary embodiment of the present invention includes a preamble 10, a plurality of packet data unit (PDU) slots 20, a plurality of network maintenance unit (NMU) slots 30, and a plurality of acknowledgement (ACK) slots 40, and further includes request to send (RTS) slots 50 and clear to send (CTS) slots 60.

The preamble 10 is positioned at the head of the frame, and N (where N is an integer) PDU slots 20 and K (where K is an integer) NMU slots 30 follow in sequence. N ACK slots 40 of the same number as the PDU slots are positioned following the NMU slots 30. After the ACK slots 40, L (where L is a positive integer) RTS slots 50 are positioned and the CTS slots 60 of the same number as the RTS slots are positioned in order and then the next frame follows. A gap time when a transmission is not performed in consideration of an RF switching time and a time needed for decoding is defined between slots. More particularly, the gap time, that is, a gap represents an interval when a transmission is not allowed under consideration of time occupied by switching between transmitting and receiving, and decoding time.

The preamble 10 is a preamble signal to be used in relaying synchronization.

The PDU slot 20 represents a slot or a channel for transmission of user data, and the NMU slot 30 represents a slot or a channel to be broadcasted to neighboring nodes for routing, synchronization relaying, and other purposes. The ACK slot 40 represents a slot or a channel to be used for informing of success or failure for PDU reception, the RTS slot 50 represents a slot or a channel to be used for a PDU occupying request, and the CTS slot 60 represents a slot or a channel to be used for allowing the PDU occupying request.

The vertical axis of the frame represents the order of subcarriers, and the horizontal axis of the frame represents the order of OFDMA symbols. A slot functions as a communication channel and then nodes can individually transmit or receive a message through a slot. Further, each node in OFDMA can simultaneously process a plurality of slots, and therefore the frame according to an exemplary embodiment of the present invention can easily support construction of multi-channel wireless ad-hoc networks that support random multiple access for multi-channel and multi-hop connections.

N=20, K=6, and L=5 in an exemplary embodiment of the present invention, and these are not restricted thereto. Further, the structure of the frame according to an exemplary embodiment of the present invention is not restricted to that as shown in FIG. 1, and for example, it may be an OFDM structure or a single carrier.

When communicating with the frame as shown in FIG. 1, the PDU slot 20 forms a pair with the ACK slot 40. For example, in a case of numbering each slot with "xx" (x=0, 1, 2, 3, . . . as shown in FIG. 1, a PDU xx makes a pair with an ACK xx. Thus, the node designated to receive the PDU xx uses the ACK xx to report whether decoding for data received through the PDU xx is a success or failure to a node that has transmitted the PDU xx. For example, a PUD 00 makes a pair with an ACK 00, and a node receives the PDU 00 from another node and transmits an acknowledgment message for the received PDU 00 with the ACK 00 to the node.

Under such a wireless communication environment, a node having time synchronization firstly determines whether a PDU slot and an ACK slot are occupied before initiating communication. When a PDU xx and an ACK xx making a pair with the PDU xx are not occupied by any nodes, a node that has acquired time synchronization and wants to start communication (hereinafter, for better comprehension and ease of description, the node will be referred to as a communication starting node) transmits a request message through an RTS slot, wherein the message is for informing another node that data will be transmitted through the PDU xx.

When a PDU xx is occupied by a node and an ACK xx making a pair with the PDU xx is not occupied by any nodes, the communication starting node can start a procedure to obtain admission for using the PDU xx with an RTS slot. In this case, an exposed node problem in WLAN may be completely resolved.

When a PDU xx and an ACK xx making a pair with the PDU xx are occupied by a node, or when a PDU xx is not occupied by any nodes and an ACK xx making a pair with the PDU xx is occupied by a node, if it is determined that a node does not request admission for using the PDU xx with an RTS slot, a hidden node problem in WLAN may be completely resolved.

The CTS slot 60 is used in a procedure for allowing a node that requests the use of a PDU slot through an RTS slot to use the PDU slot. Nodes use the RTS slot 50 and the CTS slot 60 to reserve a PDU slot and an ACK slot by a random multiple access, and may continuously use the reserved PDU slot and ACK slot.

The NMU slot 30 may be used for routing path determination and synchronization relaying. A node may transmit information on a neighboring node and information required in a protocol supporting the synchronization relaying by using the NMU slot 30. All nodes transmit an NMU slot at a random time point at an interval of a predetermined t time. For example, it is assumed that a length of a frame is 10 msec and t is 5 sec, all nodes randomly select an NMU slot every 500 frames and transmit information on the selected NMU slot. Irrespective of collision caused by transmission through the randomly selected NMU slot, nodes transmit information through an NMU slot located at a random time point every t seconds. The information transmitted through NMU slots varies according to the time to adopt the change in the terminal's surroundings caused by movement of the terminal.

The NMU slot may be randomly selected and used without a reservation procedure. Even though collision occurs in an interval corresponding to an NMU slot, an additional procedure for resolving the collision is not performed. Thus, nodes randomly select an NMU slot every predetermined time and transmit information for supporting routing path determination and synchronization relaying using a preamble through the selected NMU slot.

Figure 2:
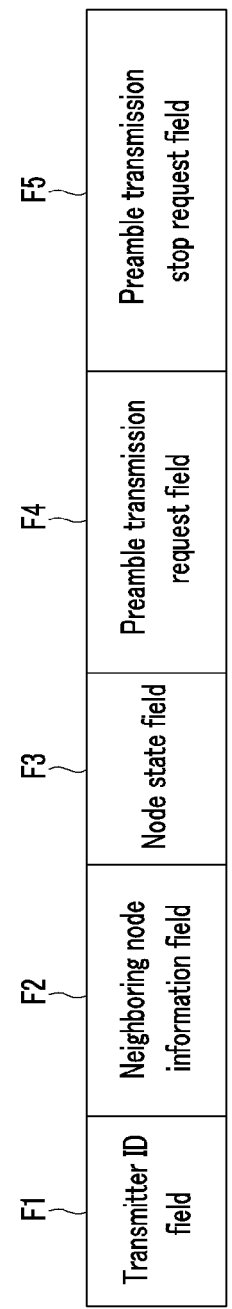
FIG. 2 shows a format of a message transmitted through an NMU slot according to an exemplary embodiment of the present invention.

FIG. 2 shows a format of a message transmitted through an NMU slot according to an exemplary embodiment of the present invention. The detailed format of the message is described in the following Table 1.

TABLE 1

| Field | Description |
| --- | --- |
| Transmitter ID | An identifier of a node for transmitting an NMU. |
| Neighboring node information | A set of identifiers of neighboring nodes. |
| Node state | Representing a backbone connection state, a synchronization acquisition state, a continual preamble transmission state, and a preamble application state for a node. |
| Preamble transmission request | Being composed of N bits and requesting preamble transmission. N represents the number of identifiers of neighboring nodes. |
| Preamble transmission stop request | Being composed of N bits and requesting to stop preamble transmission. N represents the number of identifiers of neighboring nodes. |
| Etc. | Transmitting other fields including CRC (cyclic redundancy check). |

As shown in Table 1 and FIG. 1, an NMU message transmitted through the NMU slot 30 includes a transmitter ID field F1, a neighboring node information field F2, a node state field F3, a preamble transmission request field F4, a preamble transmission stop request field F5, and an etc. field F6.

The transmitter ID field F1 represents an identifier of a node for transmitting an NMU slot.

The neighboring node information field F2 represents a set of identifiers for neighboring nodes. When the number of neighboring nodes is n, the neighboring node information field F2 includes a neighboring node ID 1, a neighboring node ID 2, . . . , and a neighboring node ID n.

The node state field F3 represents at least one among a backbone connection state, a synchronization acquisition state, a continual preamble transmission state, and a preamble application state.

The backbone connection state represents whether a node is connected to a backbone network, and more specifically, whether a node is a node connected to a backbone network or a relay node for supporting a multi-hop connection.

The synchronization acquisition state represents which method a node uses for synchronization acquisition. For example, it represents whether a method used by a node to acquire synchronization is a GPS (global positioning system) method or a method using a preamble transmitted from a neighboring node.

The continual preamble transmission state represents whether a node for transmitting an NMU, according to a request of a neighboring node, transmits a preamble every frame or only when transmitting the NUM.

The preamble application state represents whether or not a node continuously transmits a preamble according to a request of another node, in addition to transmitting a preamble when transmitting an NMU. For this, the preamble application state may be represented by n bits, and each bit corresponds to a neighboring node arranged in the neighboring node information field F2. The arrangement order of bits representing the preamble application state is mapped with the arrangement order of neighboring node identifiers arranged in the neighboring node information field F2. For example, when a node continuously transmits a preamble to a neighboring node, the preamble application state of the node is represented as "1". When a node does not continuously transmit a preamble to a neighboring node, the preamble application state of the node is represented as "0". Thus, when a neighboring node ID 1, a neighboring node ID 2, . . . , and a neighboring node ID n in order are arranged in the neighboring node information field F2 and the preamble application state is represented as "110 . . . 0", it is known that a node transmitting an NMU continuously transmits a preamble to a neighboring node 1 and a neighboring node 2 according to their request. Also, when a neighboring node ID 1, a neighboring node ID 2, . . . , and a neighboring node ID n in order are arranged in the neighboring node information field F2 and the preamble application state is represented as "000 . . . 0", it is known that there is no node requesting a node transmitting an NMU to transmit a preamble and the node transmitting an NMU transmits a preamble only when transmitting the NMU.

The node state field F3 may further include a power supplying state. The power supplying state represents which method is used to supply power to a node. For example, the power supplying state may represent that a node is power-supplied from a battery or a power plant.

The preamble transmission request field F4 represents requesting to transmit a preamble. The preamble transmission request field F4 includes n bits. Like the preamble application state, each bit of the preamble transmission request field F4 corresponds to a neighboring node arranged in the neighboring node information field F2. The arrangement order of bits representing requesting to transmit a preamble is mapped with the order of neighboring node identifiers arranged in the neighboring node information field F2. For example, when the preamble transmission request field F4 is set as "01 . . . 0", it represents that a node continuously request a neighboring node 2 of an ID 2 to transmit a preamble.

The preamble transmission stop request field F5 represents requesting to stop transmission of a preamble. The preamble transmission stop request field F5 includes n bits. Like the preamble application state, each bit of the preamble transmission stop request field F5 corresponds to a neighboring node arranged in the neighboring node information field F2. The arrangement order of bits representing requesting to stop a transmission of a preamble is mapped with the order of neighboring node identifiers arranged in the neighboring node information field F2. For example, when the preamble transmission stop request field F5 is set as "01 . . . 0", it represents that a node continuously requests a neighboring node 2 of an ID 2 to stop the transmission of the preamble.

The etc. field F6 represents other fields that may be transmitted by using an NMU such as a CRC field.

Next, the communication method according to an exemplary embodiment of the present invention will be described.

FIG. 3 shows a flowchart of the communication method according to an exemplary embodiment of the present invention, and particularly, a flowchart of the communication method for performing synchronization relaying using a preamble. Herein, performing one-hop synchronization relaying is shown in FIG. 3, and the communication method may be easily applied to performing multi-hop synchronization relaying based on FIG. 3.

A node that has acquired a common time reference (synchronization) by using a preamble transmitted from another node or a GPS may transmit a preamble when transmitting an NMU, which allows a node that has failed to acquire synchronization due to shielding of an obstacle and other factors to acquire the synchronization. The node that has acquired synchronization can recognize a starting point of a frame without a preamble, while a node that has failed to acquire synchronization cannot recognize it without a preamble. Thus, the synchronization acquisition failed node can acquire synchronization by using a preamble transmitted from the synchronization acquisition node and can then relay the synchronization with the preamble.

The node that has failed to acquire synchronization, that is, a common time reference, cannot transmit or receive. According to an exemplary embodiment of the present invention, however, the synchronization acquisition failed node can acquire synchronization by using a preamble transmitted from a neighboring node and decode an NMU transmitted from neighboring nodes.

As shown in FIG. 3, when a node 100 in which synchronization has not established is waiting for a preamble to be transmitted along with an NMU (S100), a node included in a neighboring node group 200 in which synchronization has been established transmits a preamble along with a message, that is, an NMU message (S110). The message is continuously transmitted every predetermined time to be used in determining a routing path and other factors. Herein, the NMU message may have a format as Table 1.

A node that has failed to acquire synchronization, that is, the node 100 in which synchronization has not been established, receives preambles along with the NMU messages that are transmitted from nodes of the neighboring node group 200, for example, a neighboring node 1, a neighboring node 2, . . . , a neighboring node k, . . . , and a neighboring node m, and acquires instant synchronization by using the preambles. The node 100 analyzes the states of the neighboring nodes by decoding the received NMU messages (S120-S160).

The node 100 that has acquired the instant synchronization requests a neighboring node to continuously transmit a preamble in consideration of the state of the neighboring node when continuous synchronization acquisition is needed. More specifically, when continuous synchronization acquisition is needed even though the instant synchronization has been acquired, the node 100 decodes and analyzes the NMU messages transmitted from the neighboring nodes and selects a neighboring node. For example, the node 100 requiring continuous synchronization acquisition refers to a power supplying state and a synchronization acquisition state of a node state field included in the received NMU message to select a neighboring node (e.g., a neighboring node k) (S170). Herein, a neighboring node that is acquiring synchronization by a GPS and is being power-supplied by a power plant may be selected.

Next, the node 100 requiring continuous synchronization requests the selected neighboring node k to transmit a preamble through an NMU message (S180). That is, the node 100 writes to request that the selected neighboring node k transmit a preamble in the preamble transmission request field F4 of the NMU message and transmits the NMU message. For example, when a neighboring node 2 is selected, "0100 . . . 0" is written in the preamble transmission request field F4 to be mapped with the order in which identifiers of neighboring nodes is arranged in the neighboring node information field F2.

The neighboring node (e.g., the neighboring node ID 2) that has received the NMU message transmitted from the node 100 requiring continuous synchronization acquisition admits the request according to the NMU message and continuously transmits a preamble (S190). Therefore, the node 100 can stably acquire synchronization with the preamble continuously transmitted from the neighboring node. From then, the node 100 can transmit or receive based on the acquired synchronization (S200).

Meanwhile, the node 100 may request the neighboring node that is continuously transmitting a preamble to stop the transmission of the preamble when the node's surroundings have been changed, for example, when the node 100 is not needed for communication or when the node has acquired synchronization by a GPS.

In this case, the node 100 writes "1" in a position corresponding to the neighboring node of the preamble transmission stop request field F5 included in an NMU message and transmits the NMU message in order to request the neighboring node, which is continuously transmitting a preamble, to stop the transmission of the preamble (S210 and S220). For example, when the node 100 has continuously received a preamble from the neighboring node 2, the node writes "0100 . . . 0" in the preamble transmission stop request field F5 to be mapped with the order in which identifiers of neighboring nodes are arranged in the neighboring node information field F2. "0100 . . . 0" of the preamble transmission stop request field F5 represents requesting the neighboring node 2 to stop the transmission of the preamble.

After this, the neighboring node (e.g., a neighboring node ID 2) having received the NMU message stops transmitting a preamble (S230). If the neighboring node is requested by another node excluding the node 100 to transmit a preamble, the neighboring node continuously transmits a preamble to the other node even though the node 100 has requested to stop the transmission of the preamble.

As shown above, in the network in which synchronization acquisition nodes and synchronization acquisition failed nodes are mixed, synchronization is established between nodes by performing synchronization relaying in which a preamble is transmitted to the synchronization acquisition failed node by using an NMU message. Herein, the NMU message for the synchronization relaying may be more frequently transmitted than an NMU message for supporting routing path determination.

According to the exemplary embodiment of the present invention, a node that has failed to acquire synchronization can easily acquire the synchronization in a network in which a plurality of nodes with a common time reference and a plurality of nodes with no common time reference are mixed.

Also, a communication protocol for synchronization acquisition with an NMU message is provided, which improves the efficiency in using a radio resource. The communication protocol can be used in a multi-channel random access and a multi-channel multi-ho p ad-hoc network based on OFDMA.

Further, when a node located at an area in which disasters such as building fires, firing in a building, and collapse of a mine has occurred cannot acquire a common time reference, the node, based on the communication method according to the exemplary embodiment of the present invention, that is, the synchronization relaying method using a preamble and an NMU slot, can make a connection between a terminal at the scene of the disaster and a control center.

In addition, synchronization can be acquired in a network such as an ad-hoc network between vehicles or a sensor and an actuator, based on the synchronization relaying method using a preamble. Also, it is possible to request a preamble transmission or a preamble transmission stop after considering the power supplying states of neighboring nodes, and thereby a network may be operated in a form of power-aware.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method of synchronization relay, the communication method comprising:
  transmitting a preamble, from at least one first node, to a second node that fails to acquire synchronization in a wireless network that includes the at least one first node having acquired synchronization;
  receiving, by the second node, the preamble transmitted from the at least one first node;
  acquiring, by the second node, time synchronization using the preamble; and
  selecting, by the second node having the time synchronization, a node among the at least one first node determined to have a common time reference and performing synchronization relay from the selected node through a predetermined position of a frame transmitted,
  wherein the receiving of the preamble includes receiving a network management unit (NMU) message from the at least one first node, and
  the NMU message includes a field having a plurality of bits in which a bit represents at least one of whether requesting a corresponding neighboring node to transmit a preamble and whether requesting a corresponding neighboring node to stop transmission of a preamble, and
  an arrangement order of bits included in the field is mapped with an arrangement order of neighboring node identifiers arranged in a neighboring node information field.

2. A communication method of synchronization relay, the communication method comprising:
  transmitting a preamble, from at least one first node, to a second node that fails to acquire synchronization in a wireless network that includes the at least one first node having acquired synchronization;
  acquiring synchronization, by the second node, by receiving the preamble disposed in a predetermined position of a frame transmitted from the at least one first node and receiving a message transmitted through a network management unit (NMU) slot of the frame;
  selecting, by the second node, one node among the at least one first node determined to have a common time reference;
  transmitting, by the second node, an NMU message including a preamble transmission request field in which information for requesting the one node to continuously transmit a preamble is written to the selected node; and
  maintaining, by the second node, time synchronization by using the preamble from the selected node through the NMU slot of the frame, and
  wherein the NMU message includes a field including a plurality of bits in which a bit represents at least one of whether requesting a corresponding neighboring node to transmit a preamble and or whether requesting a corresponding neighboring node to stop transmission of a preamble, and
  wherein an arrangement order of bits included in the field is mapped with an arrangement order of neighboring node identifiers arranged in a neighboring node information field.

3. The communication method of claim 2, wherein
the NMU message transmitted from the at least one first node includes a node state field for representing a state of a node, and
wherein the node state field comprises at least one of
  a backbone connection state for representing whether a node is connected to a backbone network,
  a synchronization acquisition state for representing which method a node uses for synchronization acquisition,
  a continual preamble transmission state for representing whether a node for transmitting an NMU, according to a request of a neighboring node, transmits a preamble every frame,
  a preamble application state for representing whether or not a node continuously transmits a preamble according to a request of another node, and
  a power supplying state for representing which method is used to supply power to a node.

4. The communication method of claim 3, wherein the selecting analyzes the node state field of the NMU message transmitted from the at least one first node and selects a node based on a result of the analyzing.

5. The communication method of claim 3, wherein the selecting selects a node that acquires synchronization by using a GPS (global positioning system) and is power-supplied from a power plant, among at least first node.

6. The communication method of claim 2, further comprising
transmitting, by the second node, an NMU message including a preamble transmission stop request field in which information for requesting the selected node to stop the transmission of the preamble is written to the selected node.

7. The communication method of claim 2, wherein the wireless network is a multi-channel ad-hoc network that supports multi-channel random access and multi-hop connection.

8. The communication method of claim 1,
wherein the NMU message is transmitted at an interval of a predetermined time.

9. The communication method of claim 8, wherein the selecting comprises:
analyzing, by the second node, the NMU message transmitted from the at least one first node and implementing the selecting based on a result of the analyzing;
transmitting, by the second node, an NMU message that requests the selected node to continuously transmit a preamble; and
receiving, by the second node, a preamble from the selected node and maintaining the time synchronization based on the preamble.

10. The communication method of claim 9, wherein the selecting includes selecting a node that acquires synchronization by using a GPS (global positioning system) among the at least one first node.

11. The communication method of claim 10, wherein the selecting includes selecting a node that is power-supplied from a power plant among the at least one first node.

12. The communication method of claim 1, further comprising
requesting, by the second node, the selected node to stop the transmission of the preamble.

13. The communication method of claim 1, wherein the frame includes a preamble, packet data unit (PDU) slots, NMU slots, and acknowledgment (ACK) slots, wherein the preamble is positioned at the head of the frame.

14. The communication method of claim 13, wherein an NMU message is transmitted through the NMU slots, and
Wherein the NMU message comprises at least one of
a transmitter identifier (ID) field for including an identifier of a node for transmitting a message,
a neighboring node information field for including a set of identifiers for neighboring nodes,
a node state field for representing a state of a node,
a preamble transmission request field for representing requesting to transmit a preamble, and
a preamble transmission stop request field for representing requesting to stop transmission of a preamble.

15. The communication method of claim 14, wherein
the node state field comprises at least one of
a backbone connection state for representing whether a node is connected to a backbone network,
a synchronization acquisition state for representing which method a node uses for synchronization acquisition,
a continual preamble transmission state for representing whether a node for transmitting an NMU, according to a request of a neighboring node, transmits a preamble every frame,
a preamble application state for representing whether or not a node continuously transmits a preamble according to a request of another node, and
a power supplying state for representing which method is used to supply power to a node.

16. The communication method of claim 15, wherein an arrangement order of bits representing the preamble application state is mapped with an arrangement order of neighboring node identifiers arranged in the neighboring node information field, wherein each of the bits of the preamble application state represents whether a corresponding neighboring node transmits a preamble.

* * * * *